J. H. FARMER.
HOG YOKE.
APPLICATION FILED MAR. 9, 1918.
1,265,896.
Patented May 14, 1918.
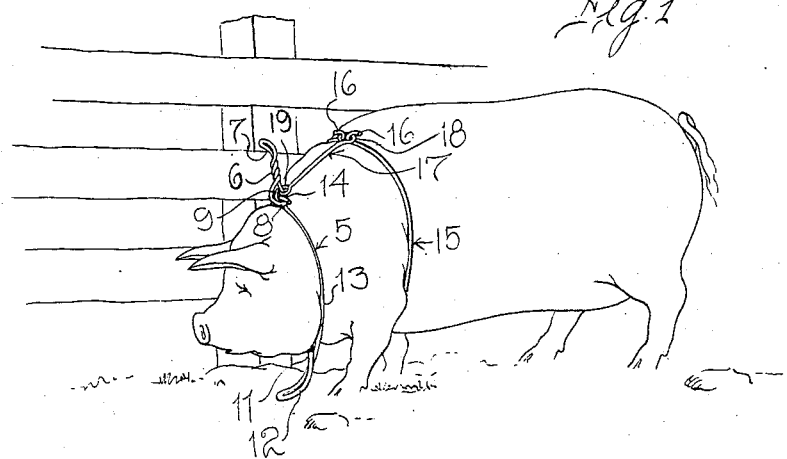
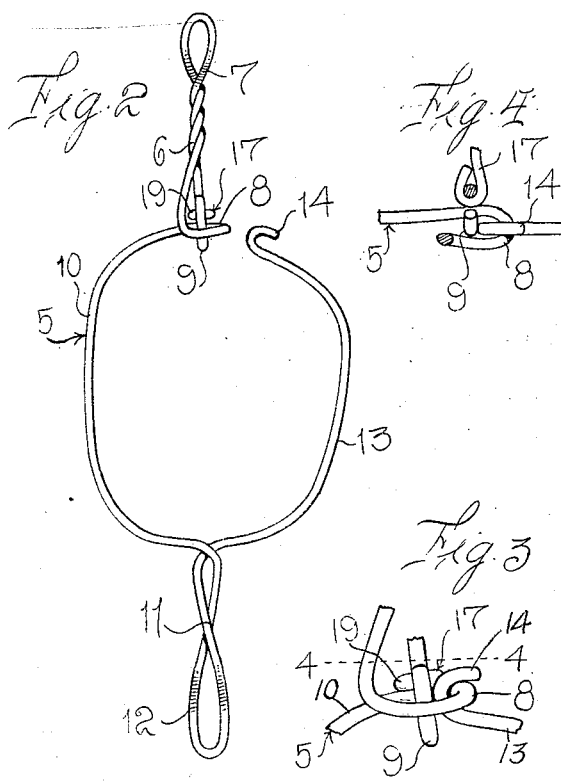
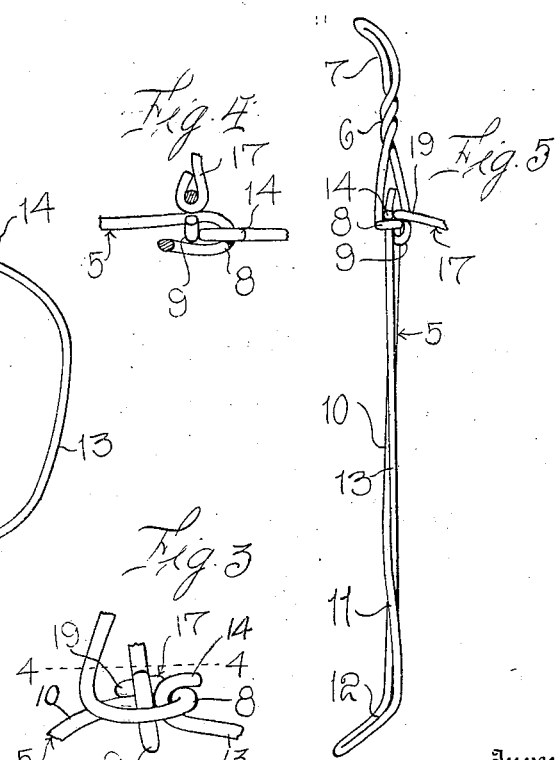
Inventor
James H. Farmer
By Watson E. Coleman
Attorney

UNITED STATES PATENT OFFICE.

JAMES HENRY FARMER, OF STONEWALL, OKLAHOMA.

HOG-YOKE.

1,265,896.   Specification of Letters Patent.   Patented May 14, 1918.

Application filed March 9, 1918. Serial No. 221,521.

*To all whom it may concern:*

Be it known that I, JAMES H. FARMER, a citizen of the United States, residing at Stonewall, in the county of Pontotoc and State of Oklahoma, have invented certain new and useful Improvements in Hog-Yokes, of which the following is a specification, reference being had to the accompanying drawings.

This invention relates to hog yokes and has for its primary object to provide a very simple and effective device especially designed for application to hogs or other small domestic animals which will prevent rooting and also render it impossible for the animal to work its head under the fence bounding the inclosure.

It is a more particular object of my invention to provide an animal yoke for the above purpose which may be easily and quickly applied or removed, and which it will, when properly fastened in operative position, be impossible to displace or remove by the efforts of the animal.

It is also a further general object of the invention to provide an animal yoke entirely constructed of wire and which is therefore capable of being manufactured at small cost as well as being durable and serviceable in practical use.

With the above and other objects in view the invention consists in the improved combination, construction and relative arrangement of the several parts, as will be hereinafter more fully described, subsequently claimed and illustrated in the accompanying drawings in which similar reference characters designate corresponding parts throughout the several views, and wherein:

Figure 1 is a perspective view showing my improved hog yoke applied to the animal;

Fig. 2 is an elevation showing the yoke open;

Fig. 3 is an enlarged fragmentary elevation of the latch means for the yoke, the yoke being closed;

Fig. 4 is a section taken on the line 4—4 of Fig. 3; and

Fig. 5 is an edge view of the yoke.

Referring in detail to the drawings 5 designates the yoke proper which is formed from a single length of wire. This wire is bent upon itself in spaced relation to one of its ends and returned, such returned portion of the wire being twisted around the body of the wire as indicated at 6 to provide a relatively rigid arm or extension projecting above the yoke proper. At the upper end of this twisted portion, a loop slightly bent or curved forwardly as shown at 7 is formed. In spaced relation to the lower end of the twisted portion 6 the body of the wire is bent upon itself to provide a horizontally disposed elongated loop 8 and the terminal of the wire extended from the twisted portion 6 thereof is bent to form an eye 9 having loose sliding engagement upon one side of this loop. It will be noted that normally the eye 9 is disposed some distance within the loop 8 in spaced relation to its open end. From the loop 8 the wire is laterally extended and bowed as at 10 to form one side of the yoke. At the lower side of the yoke 5, the middle portion of the wire is twisted as at 11 and downwardly extended to form an arm or projection, the lower end of which is forwardly curved as at 12. From the twisted portion 11 of the wire the other end portion thereof is laterally bowed or curved as at 13 in opposed relation to the bowed portion 10 to form the other side of the yoke, and the other terminal of the wire at the upper end of the bowed portion 13 is bent to provide a latch hook 14. This latch hook is adapted to be inserted upwardly through the lop 8, the eye 9 being first urged toward the open end of the loop. Upon the release of pressure on the eye 9, it will return to its normal position and force the bill of the hook 14 over the closed end of the loop 8. Thus the yoke is securely closed at its upper side and opening of the same by accident or the efforts of the animal to relieve itself of the yoke is obviated.

In connection with the yoke 5 I also use a ring or girdle shown at 15. This ring is adapted to surround the body of the animal just rearwardly of the forelegs and the terminals of the ring are provided with hooks 16 adapted for engagement through the eye 18 formed in one end of a wire rod 17. The hook bills are then tightly clenched and closed to prevent disconnection of the wire 17 from the ring 15. The other end of this wire which extends along the neck of the animal, is also provided with a hook 19 which is engaged through the terminal eye 9 of the yoke wire, and then closed.

Having applied the device to a hog or other animal as seen in Fig. 1 of the drawing, the arms or extensions 6 and 11 formed in the yoke wire which project above and below the neck of the animal, renders it impossible for the animal to thrust its head under the lower wire or bar of a fence or like inclosure and the downward projecting arm 11 of the yoke also makes it impossible for the animal to root into the ground. The girdle ring or wire which snugly fits around the animal's body close to the forelegs, will prevent rearward shifting movement of the yoke upon the animal's neck, while the connecting wire 15 will serve to prevent forward angular movement of the yoke. It will thus be apparent that I have devised a yoke for domestic animals which will be very effective and reliable for the purpose in view. My improved latch means for the yoke as above described, enables the operator to very easily and quickly apply the device to the neck of the animal or removed therefrom, while at the same time the yoke can not be readily opened by pressure against the sides thereof as might be occasioned in the efforts of the animal to relieve itself of the restraining influence of the device. Of course it is apparent that the yoke may be constructed in a variety of sizes for application to large or small animals. It can however, owing to the fact that it is entirely constructed of wire, be produced at comparatively small cost.

While I have herein shown and described the preferred construction and arrangement of the several parts of the device, it is to be understood that the same are susceptible of considerable modification and I therefore reserve the privilege of adopting all such legitimate changes as may be fairly embodied in the spirit and scope of the invention as claimed.

I claim:

1. An animal yoke comprising a length of wire bent to provide the opposed sides of the yoke, one side of the yoke being extended and formed into an open loop, one terminal of the wire having an eye therein slidable upon one side of said loop, the opposite side of the yoke terminating at one end in a hook for engagement through said loop, and said eye coacting with said hook to retain the same in locked engagement with the loop.

2. An animal yoke comprising a length of wire bent to provide the opposed sides of the yoke, one side of the yoke being extended and formed into an open loop, one terminal of the wire having an eye therein slidable upon one side of said loop, the opposite side of the yoke terminating at one end in a hook for engagement through said loop, said eye being urged by the inherent resiliency of the wire toward the closed end of the loop and coacting with said hook to retain the hook in locked engagement with the loop.

3. An animal yoke comprising a length of wire bent upon itself to form the opposed sides of the yoke and having twisted portions constituting relatively rigid arms projecting above and below the yoke proper, one twisted portion of the wire of the upper yoke arm being laterally extended at its junction with one side of the yoke to form an open loop and the other twisted portion of said arm terminating in an eye having loose sliding engagement on one side of said loop, the other side of the yoke proper having a terminal hook on its upper end adapted for engagement through said loop, said eye coacting with the hook to yieldingly urge the hook bill over the closed end of the loop.

4. An animal yoke comprising a yoke proper formed from a single length of wire bent to provide the opposite sides of the yoke, and arms extending above and below the neck engaging portions of the wire, said wire terminating at one of its ends in an eye, a wire girdle adapted to be engaged about the body of the animal rearwardly of the forelegs, and a wire connected at one of its ends to said terminal eye of the yoke wire and connected at its other end to said girdle wire.

In testimony whereof I hereunto affix my signature in the presence of two witnesses.

JAMES HENRY FARMER.

Witnesses:
  J. D. CRAWFORD,
  Mrs. COLLIER REID.

Copies of this patent may be obtained for five cents each, by addressing the "Commissioner of Patents, Washington, D. C."